United States Patent [19]
Toda

[11] Patent Number: 5,047,637
[45] Date of Patent: Sep. 10, 1991

[54] ATOMIC PROBE TYPE MICROSCOPE APPARATUS

[75] Inventor: Akitoshi Toda, Kunitachi, Japan

[73] Assignee: Olympus Optical Co., Ltd., Tokyo, Japan

[21] Appl. No.: 525,076

[22] Filed: May 17, 1990

[30] Foreign Application Priority Data

May 29, 1989 [JP] Japan .................................. 1-135013

[51] Int. Cl.$^5$ .......................................... H01J 37/252
[52] U.S. Cl. ................................. 250/306; 250/443.1; 73/105
[58] Field of Search ..................... 250/306, 307, 443.1; 73/105

[56] References Cited

U.S. PATENT DOCUMENTS 4,747,698  5/1988  Wickramasinghe et al. ........ 250/306
4,841,148  6/1989  Lyding ................................ 250/306

FOREIGN PATENT DOCUMENTS 0194323  9/1986  European Pat. Off. .

OTHER PUBLICATIONS

Physical Review B, vol. 34, No. 2, Jul. 15, 1986; pp. 994–1005.

Primary Examiner—Jack I. Berman
Attorney, Agent, or Firm—Frishauf, Holtz, Goodman & Woodward

[57] ABSTRACT

A scanning tunneling microscopy apparatus includes a specimen mount on which a specimen is located, a probe for scanning the surface of the specimen, and a scanning unit for two- or three-dimensionally changing a relative positional relation between the specimen and the probe. A temperature control mechanism is located near the probe and/or the specimen to achieve temperature control. It is thus possible to eliminate an adverse effect upon the resolution of a microscope which results from a temperature variation and to make a measurement under any given temperature condition. The temperature control mechanism includes a Peltier element as a source for heating and cooling and a temperature sensor.

9 Claims, 4 Drawing Sheets

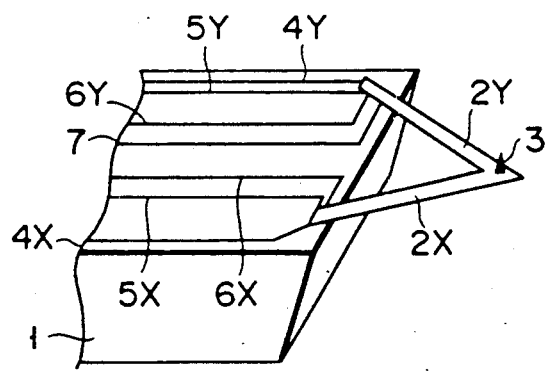
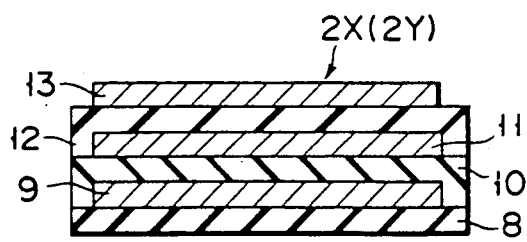
F I G. 1A PRIOR ART   F I G. 1B PRIOR ART
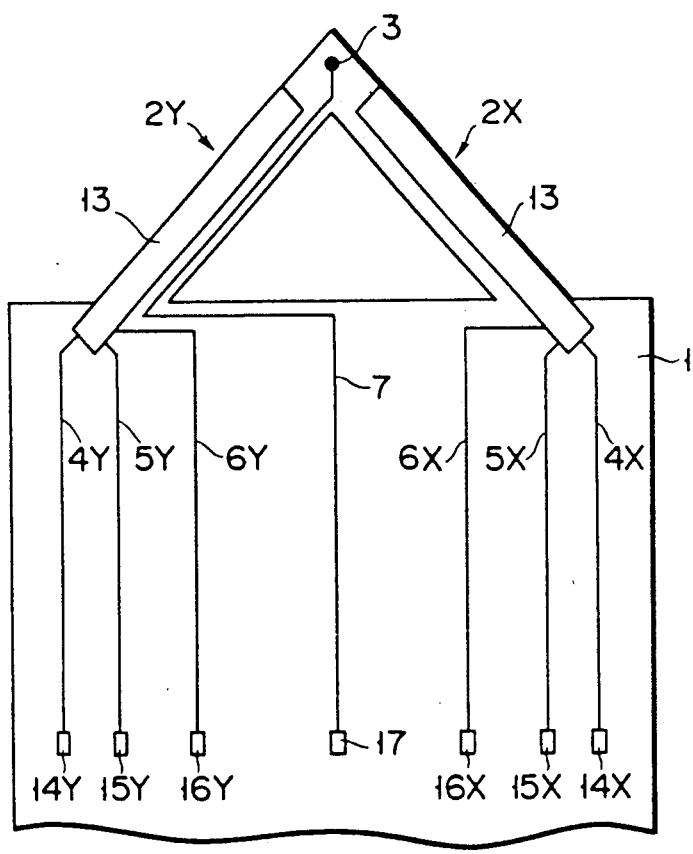
F I G. 1C PRIOR ART

ATOMIC PROBE TYPE MICROSCOPE APPARATUS

BACKGROUND OF THE INVENTION

1. Field of the Invention

The present invention relates to an atomic probe type microscope apparatus, such as a scanning tunneling microscope apparatus, and, in particular, to an atomic probe type microscope apparatus which has an improved stability and controllability against a temperature variation.

2. Description of the Related Art

The scanning tunneling microscope (STM) utilizes a free electron wave (tunneling current) penetrated by a tunneling effect from the surface of an object to microscopically observe an array of atoms in the surface of the object while being scanned. The wavelength of the free electron wave is shortest among controllable wavelengths and is of the order of the interatomic distance of the object. It is possible to obtain data on a microstructure in the surface of the object with the use of the STM.

The STM includes a needle-tipped electrode for passing a tunneling current through a test specimen and a support for holding the needle-tipped electrode. An earlier type STM is normally of such a tube type that the needle-tipped electrode probe is provided on a cylindrical support. In recent years, an STM has been proposed, for example, in EP 0194323 A1, in which a small needle-tipped electrode is formed at an area of less than 1 mm² by a microfabrication technique which has been employed in an LSI process. Such an STM so microfabricated will be hereinafter referred to as a "$\mu$-STM".

A $\mu$-STM is also known which can scan an object in a range of a few $\mu$m with the use of an actuator. A cantilever type $\mu$-STM which has been announced in the third STM International Conference is shown, as an example, in FIGS. 1A, 1B and 1C.

In FIG. 1A, reference numeral 1 shows a substrate which is preferably made of a semiconductor substrate such as silicon. X direction and Y direction actuators 2X and 2Y are formed on the top surface of the substrate 1. The actuators 2X and 2Y extend outwardly from the edge of the substrate 1 with their forward ends joined each other. A small needle-tipped electrode probe 3 is projected at a surface of the joined site of the actuators 2X and 2Y. Wires 4X to 6X, 4Y to 6Y and 7 are formed on the surface of the substrate 1.

FIG. 1B is a cross-sectional view showing actuators 2X and 2Y. As shown in FIG. 1B, the respective actuator is composed of a laminate comprising an SiO₂ layer 8, Al layer 9, piezoelectric material layer 10, Al layer 11, piezoelectric material layer 12 and Al/Au layer 13. As the piezoelectric material layers 10 and 12, use is made of, for example, ZnO or lead zirconate titanate. The Al layers 9, 11 and Al/Au layer 13 form electrodes for voltage application. A voltage is applied to the piezoelectric material layers through these electrodes. By so doing, a deformation, which is about 40 A/V in the case of using ZnO, is developed in the piezoelectric material layers 10, 12. By controlling the application voltage it is possible to control deformations in the actuators 2X, 2Y and to make a scan of a small needletipped electrode 3 in a predetermined, very small range.

FIG. 1C is a pan view showing a wiring state of the aforementioned cantilever type $\mu$-STM. As seen from FIG. 1C, various wires are arranged on the surface of the substrate 1. The wires 4X, 5X and 6X are respectively connected to the electrodes 9, 11 and 13 of the actuator 2X and the wires 4Y, 5Y and 6Y are respectively connected to the electrodes 9, 11 and 13 of the actuator 2Y. The wire 7 is connected to the needle-tipped electrode 3. The wires 4X to 6X, 4Y to 6Y and 7 are connected to terminals 14X to 16X, 14Y to 16Y and 17, respectively.

In the fabrication of the cantilever type $\mu$-STM, the SiO₂ layer 8, Al layer 9, piezoelectric material layer 10, Al layer 11, piezoelectric layer 12 and Al/Au layer 13 are formed over the substrate 1 by means of, for example, a CVD, sputtering or PEP technique to provide the actuators 2X and 2Y over the substrate 1. Further, the small needle-tipped electrode 3 is formed at the joined site 3 of the actuators 2X and 2Y. Then the portion of the substrate 1 is etched away so that the aforementioned actuators 2X, 2Y extend outwardly from the edge of the substrate 1 as shown in FIG. 1A.

The aforementioned small needle-tipped electrode probe 3 is formed in a process as shown in FIGS. 2A, 2B and 2C. That is, a spacer layer 21 and Ti/W mask layer 22 are formed over the piezoelectric material layer 12 of which the actuator is formed. In this case, the spacer layer 21 is formed of a removable material such as Cu. An opening of the order of 5 $\mu$ is formed by the PEP method in the mask layer 22 and, with the mask layer as an etching mask, the spacer layer 21 is overetched to provide an undercut hole 23. Then as shown in FIG. 2B a needle-tipped electrode 3 is formed as a conical body in the undercut hole 23 by vacuum deposition of a metal, such as Ta. Then the spacer layer 21 is etched and, as shown in FIG. 2C, the mask layer 22 and overlying Ta layer are lifted off the piezoelectric material layer 12.

In order to achieve a stable, high resolution on the STM of an atomic scale order, it is important to adequately eliminate an adverse effect resulting from vibration and temperature variation.

The aforementioned $\mu$-STM is excellent in eliminating vibration. That is, because of an apparatus of that reduced size, the resonance frequency of the tunneling probe unit goes high, resulting in a strong immunity against vibration.

Studies have been carried out to eliminate an effect resulting from the temperature variation on the ordinary STM, but not adequately on the $\mu$-STM.

SUMMARY OF THE INVENTION

It is accordingly the object of the present invention to provide a $\mu$-STM apparatus capable of a stable, high resolution by eliminating an effect resulting from a temperature variation.

In addition to the need of temperature control to achieve such a high resolution, there is a continued demand that a measuring operation be performed at an arbitrary temperature by controlling a temperature around the probe of the STM apparatus. However, this type of STM apparatus has not so far been studied properly.

Another object of the present invention is to provide a $\mu$-STM apparatus which can set a temperature around its probe to a desired temperature for a brief period of time.

In order to achieve the aforementioned task, a temperature control means is provided near a to-be-measured specimen and/or the probe.

That is, a scanning tunneling microscope apparatus of the present invention comprises a specimen mount on which a specimen is located, a probe for scanning the surface of the specimen, a scanning unit for two- or three-dimensionally changing a relative positional relation between the probe and the specimen, and a temperature control mechanism located near the probe and/or the specimen.

In the scanning tunneling microscope apparatus, a temperature control mechanism is provided near the probe and actuator to eliminate an effect resulting from a temperature variation.

As the temperature control means of the present application, use can be made of a temperature control device for circulating a temperature-controlled liquid or gas, or a solid-state temperature control element, such as a Peltier element. It is preferable to use the solid-state temperature control element in particular.

The Peltier element is used as a thermoelectro cooling element utilizing the "Peltier effect" of the semiconductor. The element can perform temperature control both in a heating and in a cooling direction upon the passage of a current and has so far been employed widely in various fields of art. The Peltier elements now commercially available on the market are of the order of 4 mm×4 mm to 30 mm×30 mm in dimension and, if being not of a laminated type, are of the order of 2 to 5 mm in thickness.

The temperature control means, such as the Peltier element, is attached to an associated member at a location near the probe and actuator so that the motion of the probe and actuator may not be prevented. As has already been set forth above, the attachment of the Peltier element can be achieved because a flat surface is provided in the neighborhood of the probe of the $\mu$-STM. Further, the Peltier element contains no movable parts, offering an advantage of involving no vibration problem. As the Peltier element, even if being very small in its structure, can produce a temperature difference of about 0° to about 70° C. depending upon the heat load capacity of the $\mu$-STM, it can preferably be employed according to the present invention.

According to the present invention, the set temperature by the temperature control means, such as the Peltier element is not restricted to any particular level. Normally, the aforementioned temperature is often set to nearly room temperature and, as the case may be, can be set to a level of 0° C. or below or a level of 100° C. or above.

The scanning tunneling microscope apparatus of the present invention can eliminate an adverse effect resulting from a temperature variation, thus achieving a stable, high image resolution. Further, the temperature prevailing in the neighborhood of the probe can be set to any arbitrary temperature for a brief period of time, enabling a measurement to be made under a highly accurate temperature.

A particularly effective observation can be made on a measurement of charge-density waves (CDW) by the STM, reference being made, for example, to "Charge-Density-Wave Studied with the Use of a Scanning Tunneling Microscope; Physical Review B; Vol. 34, No. 2, P 994 (1986)". In this case it is known that IT-TaS$_2$ (Tantalum sulphide), etc., produce a nearly commensurate CDW and incommensurate CDW at room temperature and at 80° C., respectively, and thus produce a difference between these temperatures. It is, therefore, necessary to perform a very high control of temperature upon the measurement of a specimen. In an STM using a conventional tube type scanner, tripod, etc., there is no effective means for accurately controlling the temperature on the "needle" side and hence no other better way than the way of measuring a specimen with the STM apparatus wholly held in a thermostatic tank. This takes some time upon cooling or heating. Further, even if the temperature as set forth above was to be set to any given level, the temperature control would not be able to be performed with high accuracy because a location or a zone to be temperature-controlled is not situated near the temperature control means.

According to the present invention, the temperature control element is combined with the $\mu$-STM, enabling a compact mechanism near the probe so that a local temperature control is carried out. It is according to the present invention that a measurement can highly accurately be performed with a very simple mechanism.

Recently, a scanning microscope has been developed as what is called an "atomic probe microscope" utilizing a high-accuracy positioning scan technique and servo technique, whereby, as in the case of the aforementioned STM, a physical phenomenon is caught in an atomic or near-atomic level and displayed at a corresponding image resolution. This type of scanning microscope includes not only the aforementioned STM but also a interatomic force microscope, thermal profiler, etc. The present invention can also be applied to such an atomic probe microscope.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A to 1C are views showing a conventional $\mu$-STM structure;

DETAILED DESCRIPTION OF THE PREFERRED EMBODIMENTS

Figure 2A:
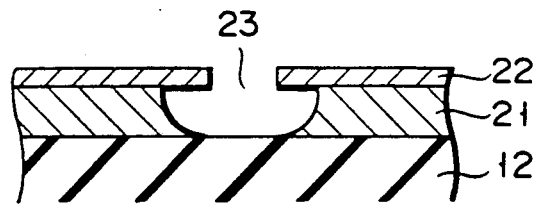
FIGS. 2A to 2C are views showing a conventional method for forming a very small probe for a $\mu$-STM.
Figure 2B:
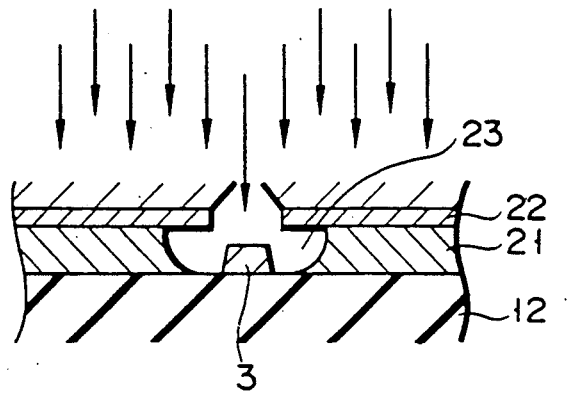
Figure 2C:
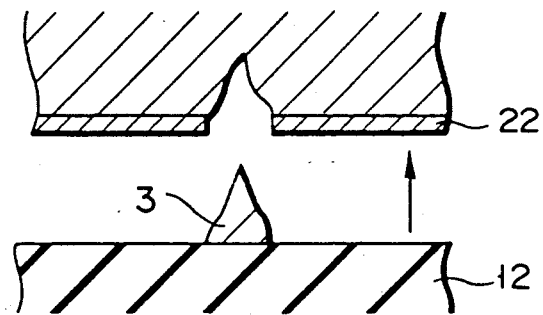
Figure 3:
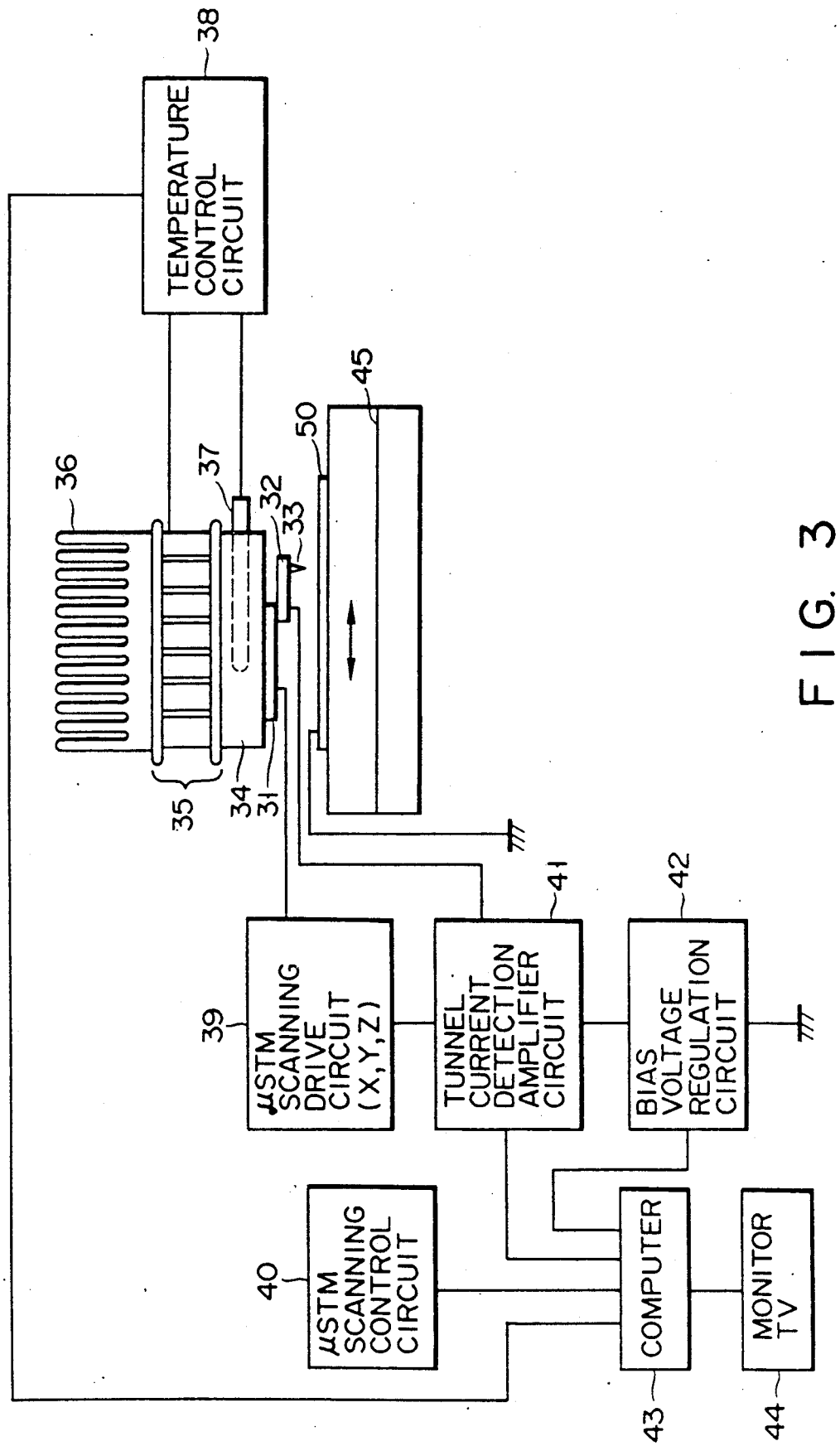
FIG. 3 is a view showing a $\mu$-STM apparatus according to one embodiment of the present invention.

FIG. 3 shows a $\mu$-STM apparatus according to one embodiment of the present invention. In FIG. 3, reference numeral 31 shows a substrate block. A cantilever type actuator 32 is provided on the substrate block 31 with a probe 33 mounted on its forward end portion as will be seen from FIG. 3. This arrangement, including the component parts 31 to 33, is basically the same as that of the μ-STM apparatus shown in FIG. 1, but another arrangement may be used for the μ-STM apparatus. Various wires, such as those for signal lines and for actuator drive, are arranged on the surface of the substrate block 31.

A temperature medium 34 made of a metal of excellent heat conduction is joined to the rear surface of the substrate block 31 of the μ-STM. A Peltier element 35 is mounted on the temperature medium and a heat radiation fin 36 is mounted on the Peltier element 35. A temperature sensor 37, such as a thermistor, is inserted into the temperature medium. The temperature sensor 37 and Peltier element 35 are connected to a temperature control circuit 38 to provide a feedback path. It is thus possible to maintain the temperature medium 34 at a predetermined temperature. As the temperature sensor 37, use can be made of other devices if they generate an electric output. It is possible to use temperature sensors, such as a platinum sensor and thermocouple, according to their temperature range.

The wire as arranged on the surface of the substrate block 31 to drive the actuator 32 is connected to a scanning drive circuit 39 which is, in turn, connected to a scanning control circuit 40. The cantilever type actuator 32 is deformed by these circuits 39 and 40 to allow the scan of the probe 33 over a very small range. The wire connected to the probe 33 is connected to a tunnel current detection amplifier circuit 41 which is, in turn, connected to a bias voltage regulation circuit 42. A bias voltage which is applied to the probe 33 is regulated by these circuits 41 and 42 and a tunnel current is detected and amplified.

The temperature control circuit 38, μ-STM scanning control circuit 40, tunnel current detection amplifier circuit 41 and bias voltage regulation circuit 42 are connected to a computer 43. The computer wholly controls the μ-STM apparatus of the embodiment and delivers a result of measurement, as an output, to a monitor TV 44.

A specimen 50 is located, beneath the μ-STM (31, 32, 33), on a specimen support mount 45. The mount 45 serves as a coarse-motion XY stage, enabling a scan to be performed over a range broader than the scanning range of the actuator 32.

The temperature medium 34 is provided for a reason as will be set forth below. That is, in view of the fact that the μ-STM (31, 32, 33) is very thin and, in almost all cases, thinner than the temperature sensor 37, it is necessary to provide the temperature medium 34 to locate the probe 33 further on the specimen side and the temperature sensor 37 behind it. If, therefore, use is made of a temperature sensor thinner than the μ-STM, it is not always necessary to provide the temperature medium 34.

The μ-STM apparatus of the aforementioned embodiment can achieve a stable, high resolution, since the Peltier element thus provided serves to eliminate an effect resulting from a variation in ambient temperature as well as an effect resulting from the generation of heat from the μ-STM per se. In the case where, for example, a change of an STM picture with time is to be measured, it is necessary to scan the specimen by the actuator 32 for a longer period of time. At that time, a considerable quantity of heat is generated but the effect of the heat can be eliminated by a cooling effect given by the Peltier element 35. Further, since the Peltier element 35 and temperature medium 34 are located very near a heat generation zone, it takes a very short time to stabilize a temperature variation, such as a cool-down or heat-up. It is also possible to prepare, for example, a preamplifier for tunnel current detection on a substrate by using an Si wafer as the substrate block 31. Since, in this case, the characteristics of the preamplifier, etc., are prevented from being changed due to a temperature variation, it is possible to obtain a stable output signal.

Figure 4:
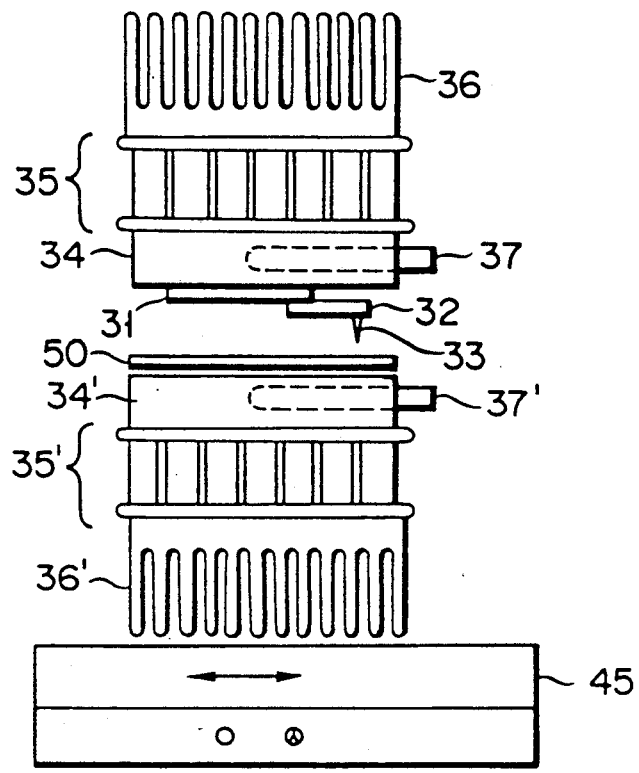
FIG. 4 is a view showing a $\mu$-STM apparatus according to another embodiment of the present invention.

FIG. 4 shows another embodiment of the present invention. In FIG. 4, identical reference numerals are employed to designate parts or elements corresponding to those shown in FIG. 3 and any further explanation is, therefore, omitted. In this embodiment, a cooling means is provided over a sample mount 45 as in the case of the μ-STM, that is, a heat radiation fin 36′, Peltier element 35′ and temperature medium 34′ are provided, one above another, over the surface of the specimen mount 45. A temperature sensor 37′ is inserted into the temperature medium 34′ and a specimen 50 is located over the temperature medium 34′. The other arrangement is exactly the same as the corresponding portion of the embodiment shown in FIG. 3.

In the embodiment shown in FIG. 4, not only the μ-STM side but also the specimen side is temperature-controlled by the Peltier element 35′, thus producing almost no temperature gradient in an up/down direction at a location between the two Peltier elements 35, 35′. According to the embodiment, therefore, it is possible to observe the specimen under a high temperature control condition.

Figure 5:
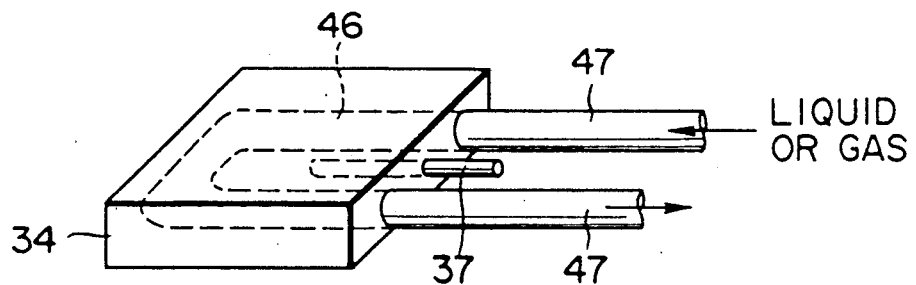
FIG. 5 is a view showing one form of a cooling means in the apparatus of the present invention.

Although the Peltier element has been used as the cooling means even in the embodiments shown in FIGS. 3 and 4, other cooling and heating means may be used as already set forth above. FIG. 5 shows a modified means from that of the preceding embodiment. In FIG. 5. reference numeral 34 shows the same type of temperature medium as that shown in FIG. 4 and a temperature sensor 37 is inserted into the temperature medium. A passage 46 for a fluid serving to control the temperature is provided in the temperature medium 34. Circulation pipes 47, 47 are connected to the passage 46 and a temperature-controlled liquid or gas is circulated in the passage 46 via the pipes 47. It is thus possible to prevent a temperature variation in the μ-STM located below the temperature medium 34 kept at a constant temperature.

Additional advantages and modifications will readily occur to those skilled in the art. Therefore, the invention in its broader aspects is not imited to the specific details, and representative devices, shown and described. Accordingly, various modifications may be made without departing from the spirit or scope of the general inventive concept as defined by the appended claims and their equivalents.

What is claimed is:

1. An atomic probe microscope apparatus for investigating a surface structure of a specimen, comprising:
   a specimen on which the specimen is located;
   a probe for scanning a surface of the specimen;
   detecting means for receiving a signal from the probe;
   means for two- or three-dimensionally changing a relative positional relation between the specimen and the probe; and
   temperature control means comprising at least one of a probe temperature control means and a specimen temperature control means for achieving temperature control independently of the detecting means wherein said probe temperature control means and said specimen temperature control means control only the temperature of the probe or specimen, respectively.

2. The apparatus according to claim 1, wherein said temperature control means includes a source for heating and cooling and a temperature sensor.

3. The apparatus according to claim 2, wherein said source is composed of a Peltier element.

4. The apparatus according to claim 2, wherein said temperature control means are provided near said probe and specimen and adapted to be operated independently.

5. The apparatus according to claim 3, wherein said temperature control means are provided near said probe and specimen and adapted to be operated independently.

6. The apparatus according to claim 3, wherein asid temperature control means substantially keeps temperature of the probe constant while the probe is scanning a surface of the specimen.

7. The apparatus according to claim 6, wherein said apparatus is a scanning tunneling microscope apparatus.

8. The apparatus according to claim 5, wherein said temperature control means substantially keeps temperature of the probe constant while the probe is scanning a surface of the specimen.

9. The apparatus according to claim 8, wherein said apparatus is a scanning tunneling microscope apparatus.

* * * * *